Nov. 11, 1969

C. E. PLYMALE 3,477,097

SYSTEM FOR DISPENSING MATERIAL ACCURATELY
THROUGH MULTIPLE ORIFICES

Filed April 1, 1965

Inventor.
CHARLES E. PLYMALE
By
ATTORNEYS

Nov. 11, 1969    C. E. PLYMALE    3,477,097
SYSTEM FOR DISPENSING MATERIAL ACCURATELY
THROUGH MULTIPLE ORIFICES
Filed April 1, 1965    3 Sheets-Sheet 3

Inventor.
CHARLES E. PLYMALE
BY
ATTORNEYS

# United States Patent Office 3,477,097
Patented Nov. 11, 1969

3,477,097
SYSTEM FOR DISPENSING MATERIAL ACCURATELY THROUGH MULTIPLE ORIFICES
Charles E. Plymale, Maumee, Ohio, assignor to Owens-Illinois Glass Company, a corporation of Ohio
Filed Apr. 1, 1965, Ser. No. 444,703
Int. Cl. B29f 3/02
U.S. Cl. 18—12                                    4 Claims

ABSTRACT OF THE DISCLOSURE

A system is provided for accurately dispensing heated and plasticized thermoplastic material through a plurality of orifices communicating with a single source of material. The extrusion head has a terraced contour with a separate orifice being provided at each step of such terraced contour. A ram having a terraced contour corresponding to that of the chamber is reciprocal in the chamber between a first position permitting communication between the outlet orifices and the chamber and a second position isolating quantities of material between the ram and the chamber stepped contour.

---

The present invention relates generally to a system for dispensing exact amounts of plasticized material, and more particularly to a novel method of and apparatus for accurately dispensing separate streams of plasticized material directly from a single source of plasticized material.

It has been proposed in the past (for example, see United States Patent 3,024,498) that plasticized material be discharged from an accumulator as a single stream, which stream is subsequently branched into a plurality of streams and injected through a plurality of orifices into article-forming injection molds or the like. Such systems are generically termed "hot runner injection systems." In order to accurately meter the amount of plasticized material discharged through each orifice during the power or extension stroke of the accumulator ram, comparatively complex and expensive orifice control equipment is required, such as displaceable orifice control metering valves operated to open and close each orifice by actuation of a timer mechanism or the like.

Such prior art systems are objectionable not only because of the substantial difficulty of coordinating the opening and closing of the orifice control valves with the extension and retraction of the ram and related problems, but also because the cost of manufacturing, installation, adjustment, supervision and maintenance of such orifice control equipment is frequently economically prohibitive or unduly burdensome, particularly to the marginal operator.

Accordingly, it would be a valuable contribution to the multiple orifice injection art to provide an inexpensive, reliable system for dispensing precisely controlled amounts of plasticized material directly from an accumulator space as separate streams to each of a plurality of orifices. The present invention provides such a system.

In the presently preferred embodiment of this invention, a novel apparatus is provided wherein, in response to axial displacement of a ram which is slidably disposed within an accumulator chamber, separate volumes of plasticized material contained within the accumulator space are first sealed or isolated between terraced portions of one end of the accumulator chamber and correspondingly terraced segments disposed on the nose of the ram. Thereafter, extremely accurate amounts of the plasticized material, isolated between the terraced portions and segments as separate volumes, are discharged to the respective orifices through separate ports in the accumulator chamber at the respective terraced portions as the independent egress streams. All or any portion of the isolated volumes of plasticized material may be discharged depending on the distance through which the ram is displaced once the volumes are isolated, such distance being adjustably settable. The ram may be of any type, including a screw-ram. Use of a screw-ram uniquely accommodates within a single space not only the accumulating and dispensing of plasticized material but also the plasticizing of the material, from granular or pelletized stock or the like.

With the foregoing in mind, it is a primary object of this invention to provide a novel system including apparatus for accurately dispensing as separate streams precise amounts of plasticized material directly from a single source or accumulator to a plurality of orifices.

Another important object of this invention is the provision of a novel, relatively inexpensive system, including apparatus for dispensing precise amounts of material directly from an accumulator chamber to multiple orifices thereby alleviating the need for expensive orifice discharge control and like equipment.

A further and no less important object of the present invention is the provision of a novel system for plasticizing and accumulating plasticizable material at a common location and thereafter dispensing precisely controlled amounts of the plasticized material as a plurality of egress streams.

These and other objects and features of this invention will become more fully apparent from the following description and appended claims taken in conjunction with the accompanying drawings, wherein:

Figure 1:
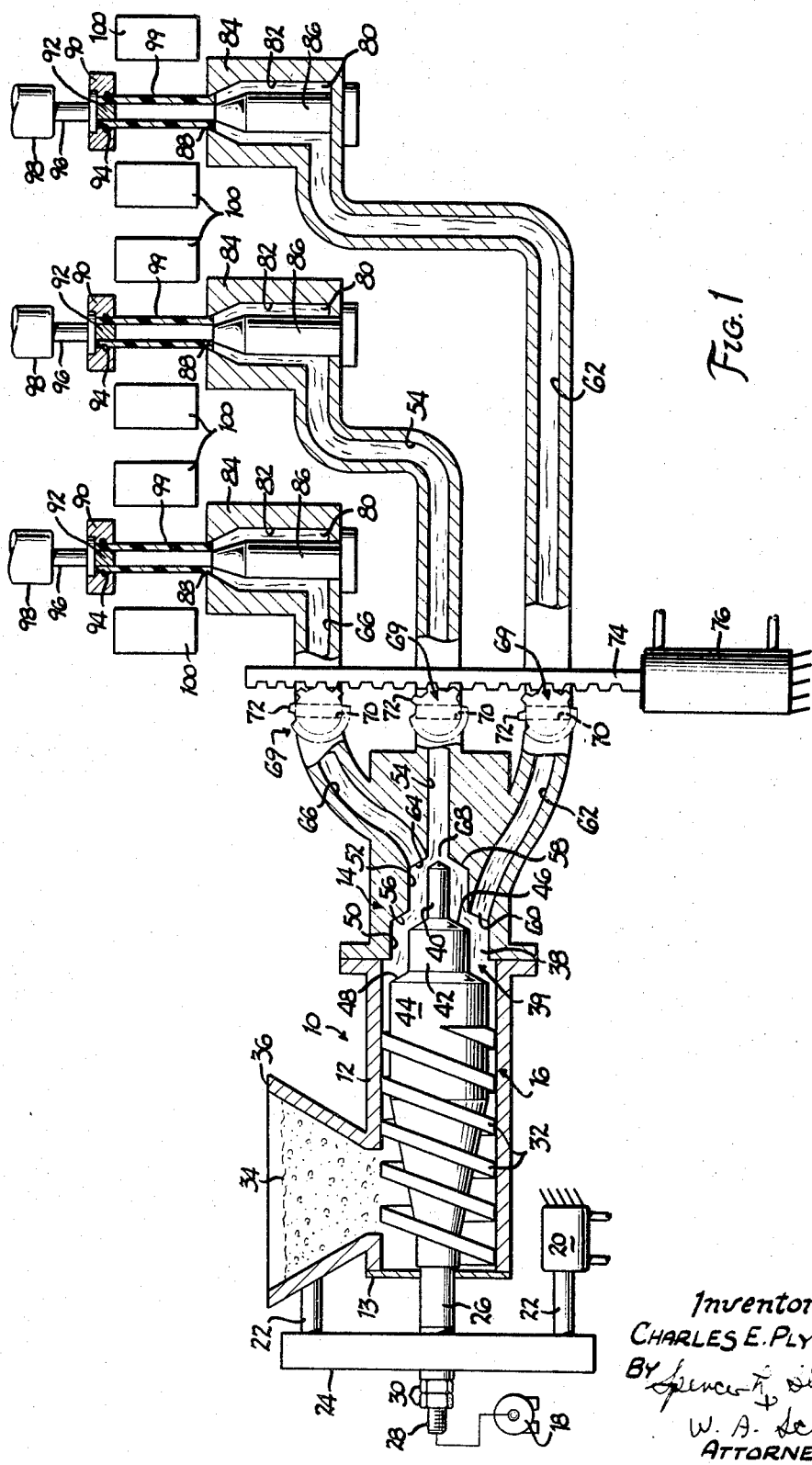
FIGURE 1 is a schematic representation, shown partly in cross section, of a presently preferred ram-accumulator embodiment of this invention with the ram fully retracted.

Reference is now made to the drawings wherein like numerals are used to designate like parts throughout. In FIGURE 1, the reference numeral 10 refers generally to a screw-ram plasticized-extruder assembly including a plasticizer-accumulator barrel 12 including an end-plate 13 and a terraced forward end piece 14, each forming part of an accumulator chamber. Rotatably and displaceably disposed within the barrel 12 and the forward end piece 14 is a helically threaded plasticizer-extruder screw-ram 16. The screw-ram 16 is rotatably driven by suitable means, such as a motor 18, and is reciprocated between extended and retracted positions within the barrel 12 and the end piece 14 by a pair of ram cylinders 20.

Each ram cylinder 20 has an acutating piston rod 22 integrally attached to a plate 24. The plate 24 is appropriately journaled upon the shaft 26 of the screw-ram 16 so as to remain non-rotatable during the rotation of the shaft 26. However, the plate 24 readily transmits the cyclic extension and retraction displacements of the piston rods 22 to the shaft 26 to accommodate like displacement of the screw-ram 16 between its extended and retracted positions. The threaded end 28 of the shaft 26 is equipped with a pair of nuts 30 which are threadedly adjusted along the end 28 to selectively set the distance through which the screw-ram 16 extended and retracted for purposes which will become subsequently more apparent as this description proceeds.

The barrel 12, as is conventional in plasticizers, may be heated by heaters and/or by the mechanical mixing action of the material as induced by rotation of the helical vanes 32 of the screw-ram 16, which results in a high heat of friction between the granular or pelletized particles 34 fed into the barrel from a hopper 36. Thus, the solid material from the hopper 36 attains full plasticity by the time it is displaced by the screw-ram vanes 32 to an accumulator space 38.

The accumulator space 38 is a variable volume space since it is disposed between the terraced nose 39 of the displaceable screw-ram 16 and the terraced end piece 14 of the accumulator assembly. The terraced nose 39 includes cylindrically shaped terraced segments 40, 42 and 44, the terrace segments 40 and 42 being interconnected along the conically shaped surface 46 and the terrace segments 42 and 44 being interconnected along the conical surface 48. The internal surface of the terraced end piece 14 is similarly contoured. End piece 14, thus, provides: (1) an annular terrace groove portion 50 having a diameter corresponding to the diameter of the terrace segment 44 of the screw-ram 16, (2) a cylindrical terrace groove portion 52 having a diameter corresponding to the diameter of the terrace segment 42 of the screw-ram 16, (3) and a cylindrical bore 54 having a diameter corresponding to the diameter of the terrace segment 40 of the screw-ram 16. The terraced end piece 14 is also contoured to provide a tapered surface 56 corresponding in size and shape to the conical surface 48 and a second tapered surface 58 which corresponds in size and shape to the conical surface 46.

As can be seen by inspection of FIGURE 1, the tapered surface 56 is provided with a port 60 leading to a passage 62 through which one stream of plasticized material is dispensed during the extension of the screw-ram 16. The tapered surface 52, similarly, is equipped with a port 64 leading to a passage 66 through which a second stream of plasticized material is displaced during the extension stroke of the screw-ram 16. Likewise, the cylindrical bore 54 is equipped with a port 68 and functions as a passage through which a third stream of plasticized material is directed during the extension stroke of the screw-ram 16.

Each of the three passages 62, 66 and 54 are respectively equipped with a rotary shut-off valve, generally designated as numeral 69. Each rotary shut-off valve 69 is equipped with a rotatable valve member having a fluid communication passage 70, constituting a bore through the central portion of the valve member. Each valve member also is equipped at one end with a pinion gear 72 which is in mesh with the teeth of a rack 74. The rack 74 constitutes an extension of the piston rod of the rack cylinder 76, which rack cylinder is actuated to open the valve ports 70 just as the extension stroke of the screw-ram 16 is initiated by actuation of the ram cylinders 20. The rack 74 is later retracted to close the valve passages 70 by actuation of the rack cylinder 76 in timed relation with completion of the extension stroke of the screw-ram extruder 16.

Plasticized material supplied through the three passages 62, 54 and 66 communicates respectively with an orifice supply chamber 80 defined between the cylindrical inner walls 82 of a mandrel block 84 and a centrally located generally cylindrical vertically extending mandrel 86. The mandrel 86 cooperates with the mandrel block 84 at the upper end thereof to define an annular outlet orifice 88 from which plasticized material is expressed.

Although the outlet orifice 88 may be properly identified as an extrusion orifice, it may be adapted to combine injection molding and extrusion operation by utilization of an injection mold 90 peripherally enclosing a centrally located plug 92 to define an injuection mold space 94. Preferably, the mold 90 is carried on the actuating rod 96 of hydraulically actuated cylinder 98 effective to move the mold 30 between its illustrated raised position and a lowered position contiguous with the mandrel block 84 at the orifice opening 88 at which the mold space 94 communicates freely and directly with the orifice 88.

As illustrated in FIGURE 1, the extruded tube 99 is adapted to be enclosed within cooperable blow mold segments 100 each preferably carried by hydraulically actuated cylinders (not shown) for closure onto the tube 99, the tube subsequently being blown internally of the mold segments 100 by introduction of pressure fluid through the actuating rod 96 and the inner mold element 92, in a manner well known in the art.

Let it be assumed, that with reference to FIGURE 1, that (1) the three extruded tubes 99 have been enclosed within the respective blow mold segments 100, (2) three plastic articles have thereafter been blown, (3) the mold segments 100 have been retracted into the position illustrated in FIGURE 1 to eject the blown articles, (4) each injection mold 90, responsive to actuation of the associated cylinder 98 through the rod 96, has been advanced downward into contiguous relation with the top of the mandrel block 84 so that the orifice 88 is in communication with the injection mold space 94, and (5) the screw-ram 16 is in its fully retracted position, as depicted in FIGURE 1. At this time, further assuming that the apparatus 10 of FIGURE 1 has been in operation for a period of time sufficient to have plasticized the material provided from the hopper 36 so as to thoroughly fill the accumulator space 38 at the nose end 39 of the screw-ram 16, the rack cylinder 76 is actuated to extend the rack 74 thereby opening the ports 70 of each of the three rotary shut-off valves 69. In timed relation with the actuation of the rack cylinder 76, the two ram cylinders 20 are also actuated so as to commence to retract their respective piston rods 22 drawing the plate 24 and the screw-ram 16 toward the right, as viewed in FIGURE 1.

The terraced nose 39 is not sealed against the inside surface of the barrel 12 and thus a limited amount of reverse flow of plasticized material between the screw-ram 16 and the barrel 12 is permitted as the screw-ram 16 is advanced toward the right.

Figure 2:
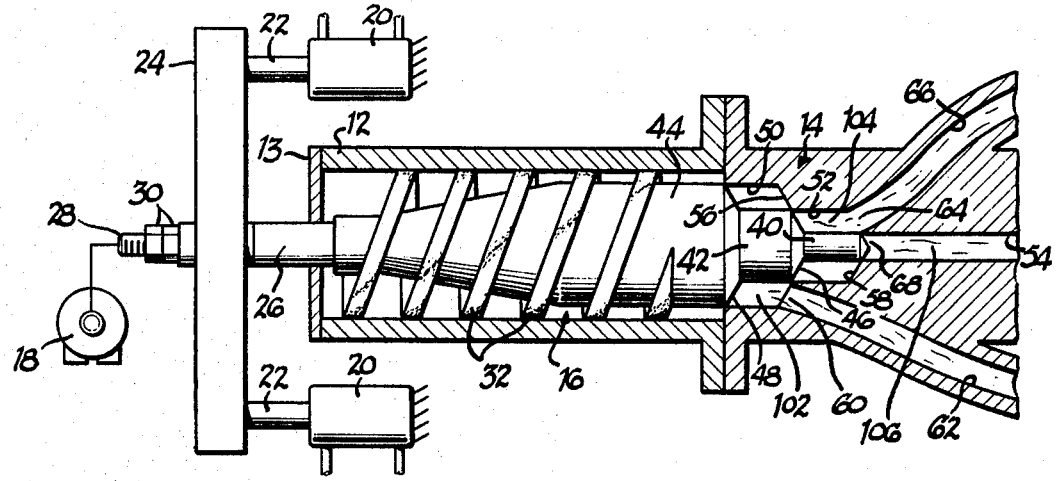
FIGURE 2 is an enlarged fragmentary schematic representation, partly shown in cross section, of the ram-accumulator of FIGURE 1 with the ram partially extended.

At an intermediate instantaneous point in time during the extension stroke of the screw-ram 16, responsive to retraction of the piston rods 22 of the cylinders 20, the extruder-ram 16 will assume the position depicted in FIGURE 2. In this position, the cylindrical terrace segment 44 will sealingly engage the cylindrical terrace groove portion 50 of the terraced end piece 14, the terrace segment 42 will sealingly engage the terrace groove portion 52 of the end piece 14 and the cylindrical terrace end 40 will be in sealed contact at port 68 with the inner surface of the cylindrical bore 54. Thus, in this intermediate instantaneous position, three separate volumes of plasticized material are isolated or trapped between the end piece 14 and the terraced nose 39 of the screw-ram 16. The first volume of plasticized material is trapped within the annular zone or space designated by numeral 102, the second isolated volume of plasticized material is contained within the enclosed zone 104, while the third isolated volume of plasticized material is disposed within the passage 54 in the vicinity of the numeral 106. At this point in time, reverse flow between the end piece 14 and terraced nose 39 of the screw-ram 16 is prohibited.

As displacement of the screw-ram 16 continues toward the right, plasticized material contained within the three zones 102, 104 and 106 is displaced along the passages 62, 66 and 54, respectively, through the open rotary shut-off valve 69, along the passage 80 and through the injection orifice 88. Initially each extruded stream of material is deposited within one injection mold cavity 94 to form a container finish and is subsequently continuously extruded through the orifice 88 as the injection mold is retracted progressively from a position contiguous with the mandrel block 84 to the elevated position depicted in FIGURE 1, at which time extrusion ceases.

By selective adjustment of the nuts 30 upon the threaded end 28 of the shaft 26 of the screw-ram 16, the distance through which the screw-ram is reciprocated may be selectively controlled. Thus, the displacement of the screw-ram 16 may be set to fully evacuate plasticized material from the three isolated zones 102, 104 and 106, i.e. see the position depicted in FIGURE 3. However, when desired, the screw-ram 16 may be set to advance a distance which only partially evacuates the plasticized material trapped within each of the three zones 102, 104 and 106, as, for example, when a relatively small container is being formed from the extruded tubes 99. Hence, by accurate controlled adjustment of the nuts 30 upon the threaded end 28 of the screw-ram shaft 26 the exact amount of isolated plasticized material discharged through the separate passages 54, 62 and 66 may be accurately controlled so that a precise amount of material is cyclically extruded through the respective orifices 88, each time the screw-ram 16 is extended. Naturally, the volumes defined by the respective zones 102, 104 and 106 may be the same as or different from each other, depending upon whether the same or different sized or shaped containers or articles are to be formed at the three blow mold stations occupied by the blow mold segments 100.

Figure 3:
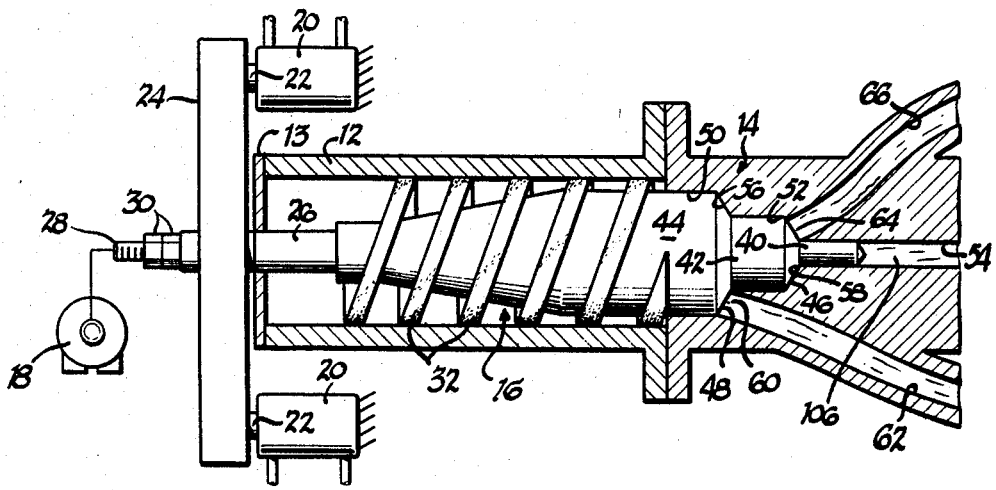
FIGURE 3 is a fragmentary schematic representation similar to FIGURE 2 but illustrating the ram in its fully extended position.

While the screw-ram 16 is illustrated in FIGURES 1 through 3 as having a terraced nose 39 comprising cylindrical terraced segments, it is to be appreciated that any desired space-providing configuration may be used and the zones in which the plasticized material is trapped need not be annular in shape but may be rectangular, octagonal or any other desired configuration extending around the entirety or any part of the periphery of the ram and the end piece. Of course, while the embodiment of FIGURES 1 through 3 is shown and described as having three passages providing egress streams from a common source of plasticized material, it should be appreciated that any desired number of terraced zones and a corresponding number of egress ports may be provided in the accumulator chamber.

It should also be appreciated that by utilization of the type of apparatus shown in FIGURE 1 and previously described, the steps of plasticizing and accumulating blowable plastic material at a single accumulator space is achieved and the plasticized material is thereafter selectively dispensed from the same location as a plurality of egress streams. Thus, the complexity and cost of the equipment and ancillary expenses related thereto required to make plastic articles is significantly reduced, while at the same time a precisely accurate volume of plasticized material is metered to each orifice 88 during the extension stroke of the screw-ram 16.

Figure 4:
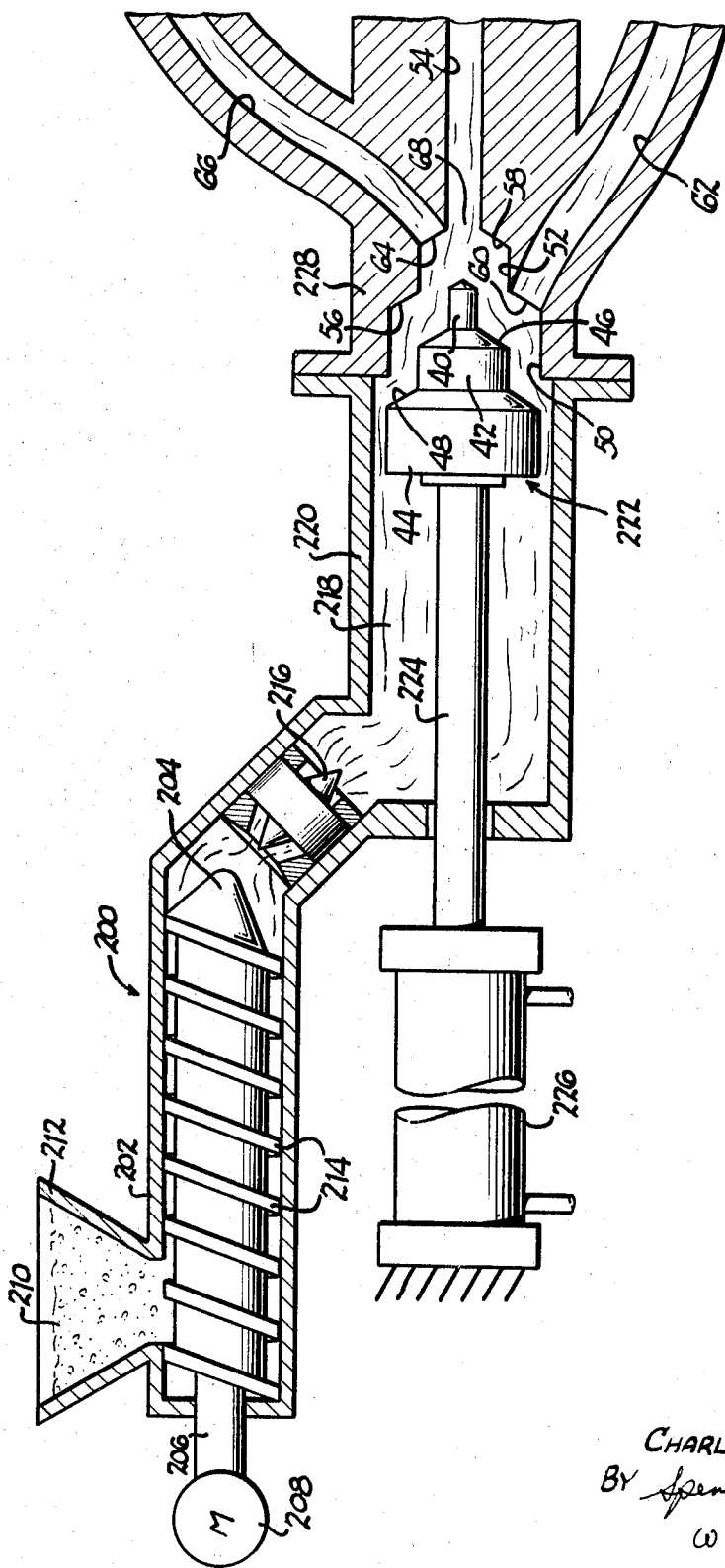
FIGURE 4 is a fragmentary schematic representation partly shown in cross section, of a second presently preferred ram-accumulator embodiment of this invention.

Reference is now made to FIGURE 4 which illustrates a second presently preferred embodiment of this invention. In this embodiment, separate mechanisms and chambers are provided for (1) plasticizing and (2) accumulating and dispensing the plasticized material through a plurality of passages to accurately provide a precisely controlled volume of plasticized material to multiple orifices.

The plasticizer-accumulator apparatus, here broadly designated numeral 200, is operated in a conventional manner. A barrel 202 contains a rotatable plasticizer screw 204 rotated through a shaft 206 by suitable means, such as a motor 208. Plasticizable material 210, usually in granular or pelletized form is introduced into the barrel 202 from the hopper 212. Through mechanical working of the plasticized material along the vanes 214 of the screw 204 and/or by use of heating elements (not shown) plasticized material is delivered at the forward end of the screw 204, through a check valve 216 and into an accumulator space 218 contained within the accumulator barrel 220.

The check valve 216 may be of the type disclosed in United States Patent 3,089,192, assigned to the assignee of the present invention.

Slidably disposed in spaced relation to the inside surface of the barrel 220 is a reciprocable ram 222. The ram 222 is integrally connected to the piston rod 224 of a stationary actuating cylinder 226, the retraction and extension of the ram 222 being responsive to fore and aft displacement of the piston rod 224 as pressure fluid is appropriately cyclically introduced and exhausted to and from the cylinder 226. The ram 222, being of somewhat less diameter than the diameter of the bore within the barrel 220, accommodates back-and-forth movement without the necessity of providing seals between the ram and the barrel. The ram 222 is depicted as having a terraced nose configuration corresponding to the terraced configuration of the nose 39 of the screw-ram 16, previously described and illustrated in FIGURES 1 through 3. The end piece 228 of the accumulator is contoured in the form of terraces corresponding to the inside configuration of the end piece 14, of the previously described embodiment. Accordingly, the components of the ram 222 and the end piece 228 has been numbered to correspond identically with the numbers of FIGURE 1. Since these components of ram 222 and end piece 228 are structurally and functionally identical to the same identified components of the previously described embodiment, only a limited further description need be presented.

The operation of the apparatus 200 of FIGURE 4 is substantially the same as that of the apparatus previously described in conjunction with FIGURES 1 through 3, the principal difference being that the plasticizing operation is performed within the barrel 200 by utilization of the screw 204 while the plasticized material is accumulated within and later dispensed from the space 218 provided by the accumulator barrel 220 and the accumulator end piece 228. Reverse flow between the accumulator space 218 and the barrel 202 is prohibited by the check valve 216, in the manner described in the previously mentioned United States Patent 3,089,192.

The cyclic extension of the ram 222 from its retracted position, depicted in FIGURE 4, into first its instantaneously sealed position adjacent the end piece 228 (substantially identical to the sealed engagement between the screw-ram 16 and the end piece 14 shown in FIGURE 2) and then, after isolation of three volumes of plasticized material as independent zones, into its fully extended position causing discharge of the plasticized material in the zones through the passages 62, 66 and 54 and out the extrusion orifices 88, in the manner previously described. The zones may be fully or partially exhausted of plasticized material, depending upon the effective length of the pison rod 224. The piston rod 224 is provided with threads (not shown) or like means to vary its effective length thereby controlling the distance through which ram 222 is cyclically reciprocated and the exact amount of plasticized material dispensed from each zone. Thus, exact control over the volume of plasticized material dispensed through each orifice 88 is accommodated, without the requirement of expensive orifice control equipment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a plastic dispensing apparatus: means for (1) plasticizing, (2) accumulating, and (3) dispensing plasticized material from a single space to a plurality of egress streams, said means comprising a chamber to receive plasticizable material, said chamber having a terraced contour at one end and a plurality of spaced egress ports, one port disposed at each of said chamber terraces, and a screw-ram having vanes to plasticize and displace said material and a terraced contour at one end sized and shaped to accommodate sealing engagement with the chamber terraces during the extension stroke of the ram.

2. In an apparatus for dispensing plasticized material, an accumulator having a stepped chamber and a plurality of outlet ports at various steps in the chamber, a ram having a stepped contour at the forward end thereof matching the stepped contour of the chamber, said ram being reciprocable from a rearward position at which the ports communicate with the chamber to a forward position at which the ports are closed from said chamber with separate volumes of plasticized material isolated between the ram and the chamber stepped contour and dispensed therefrom, at least in part, through said respective outlet ports.

3. A device as defined in claim 2 further including selectively settable means to gauge the magnitude of the ram displacement when dispensing isolated plasticized material through said respective outlet ports.

4. In an accumulator for dispensing plasticized material through a plurality of discharge openings, a reciprocable metering ram disposed within an accumulator chamber having a series of terraced portions, said ram comprising a series of terraced segments adjacent said terraced portions so that upon extension of the ram the ram terraced segments seal against respective ones of the chamber terraced portions to (1) isolate separate volumes of plasticized material between spaced terraced segments and terraced portions and (2) thereafter discharge, at least in part, each isolated volume of plasticized material from the accumulator chamber through one of the discharge openings.

References Cited

UNITED STATES PATENTS

| | | | |
|---|---|---|---|
| 2,834,051 | 5/1958 | Rekettye | 18—30 |
| 2,900,663 | 8/1959 | Linhorst | 18—30 |
| 2,953,815 | 9/1960 | Mainardi | 18—30 |
| 3,032,810 | 5/1962 | Soubier | 18—5 X |
| 3,201,799 | 8/1965 | Croyle | 18—30 |

FOREIGN PATENTS

| | | |
|---|---|---|
| 1,030,004 | 12/1954 | France. |
| 37/10077 | 2/1962 | Japan. |
| 949,129 | 2/1964 | Great Britain. |

WILBUR L. McBAY, Primary Examiner

U.S. Cl. X.R.

18—5, 14, 30; 103—2; 222—330, 404; 264—97, 98, 176, 329